United States Patent [19]
Bernard et al.

[11] Patent Number: 5,517,727
[45] Date of Patent: May 21, 1996

[54] LOW THREAD FORCE CABLE TIE

[75] Inventors: William A. Bernard, Darien; James A. Brownlee, Park Forest, both of Ill.

[73] Assignee: Panduit Corp., Tinley Park, Ill.

[21] Appl. No.: 299,024

[22] Filed: Aug. 31, 1994

Related U.S. Application Data

[63] Continuation-in-part of Ser. No. 114,803, Aug. 31, 1993, abandoned.

[51] Int. Cl.$^6$ .................................................. B65D 63/00
[52] U.S. Cl. ................................ 24/16 PB; 24/17 AP
[58] Field of Search ..................... 24/16 PB, 16 R, 24/17 AP, 17 A, 17 B; 248/74.3

[56] References Cited

U.S. PATENT DOCUMENTS

| | | |
|---|---|---|
| D. 205,940 | 10/1966 | Miller . |
| 3,186,047 | 6/1965 | Schwester et al. . |
| 3,339,246 | 9/1967 | Geisinger . |
| 3,339,247 | 9/1967 | Geisinger . |
| 3,408,699 | 11/1968 | Reynolds . |
| 3,416,198 | 12/1968 | Geisinger . |
| 3,457,598 | 7/1969 | Mariani . |
| 3,488,813 | 1/1970 | Kohke . |
| 3,747,164 | 7/1973 | Fortsch . |
| 3,892,011 | 7/1975 | Kohke ................................ 24/16 PB |
| 3,996,646 | 12/1976 | Caveney . |
| 4,135,749 | 1/1979 | Caveney ............................ 24/16 PB |
| 4,136,148 | 1/1979 | Joyce ................................. 24/16 PB |
| 5,121,524 | 6/1992 | Mortensen ........................ 24/16 PB |
| 5,263,231 | 11/1993 | Sorensen et al. . |

*Primary Examiner*—Victor N. Sakran
*Attorney, Agent, or Firm*—Mark D. Hilliard; Robert A. McCann

[57] ABSTRACT

A low thread force two piece cable tie includes a strap, a locking head forming a strap accepting channel, a metal barb positioned within the channel and mounted to the locking head, and a cored out pocket disposed adjacent the metal barb at the entrance to the strap accepting channel. The cored out pocket allows for a slight rotation of the metal barb during insertion of the tip of the strap which enhances the threadability of the cable tie.

17 Claims, 4 Drawing Sheets

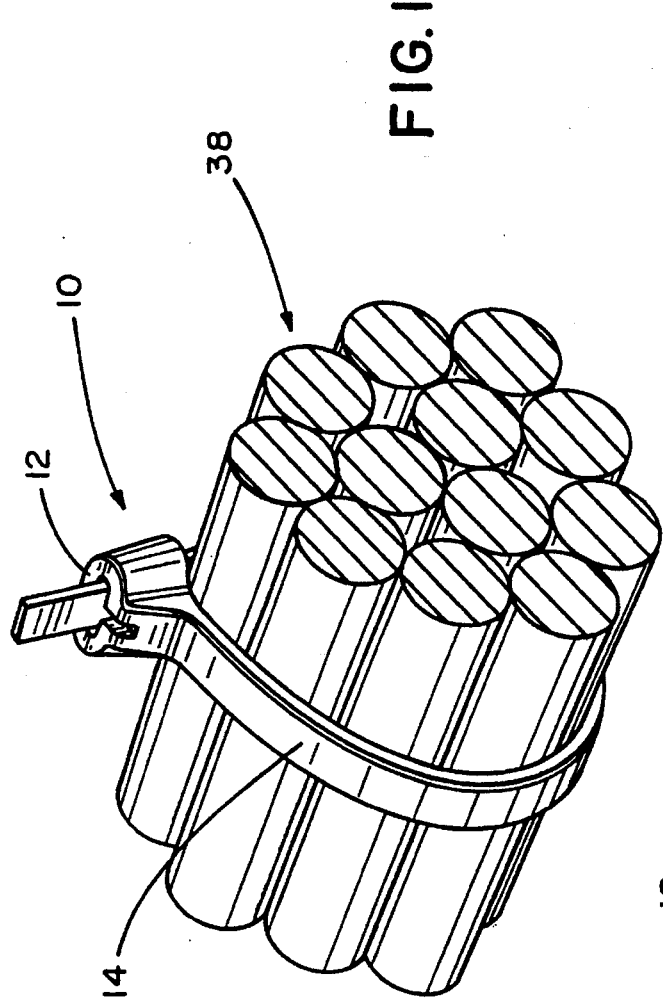
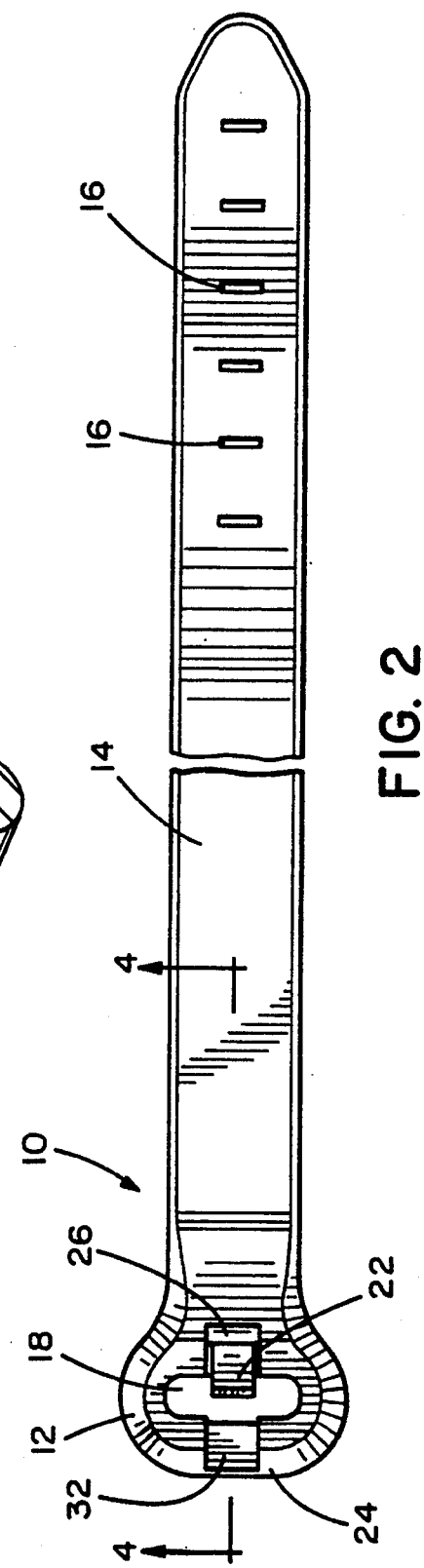

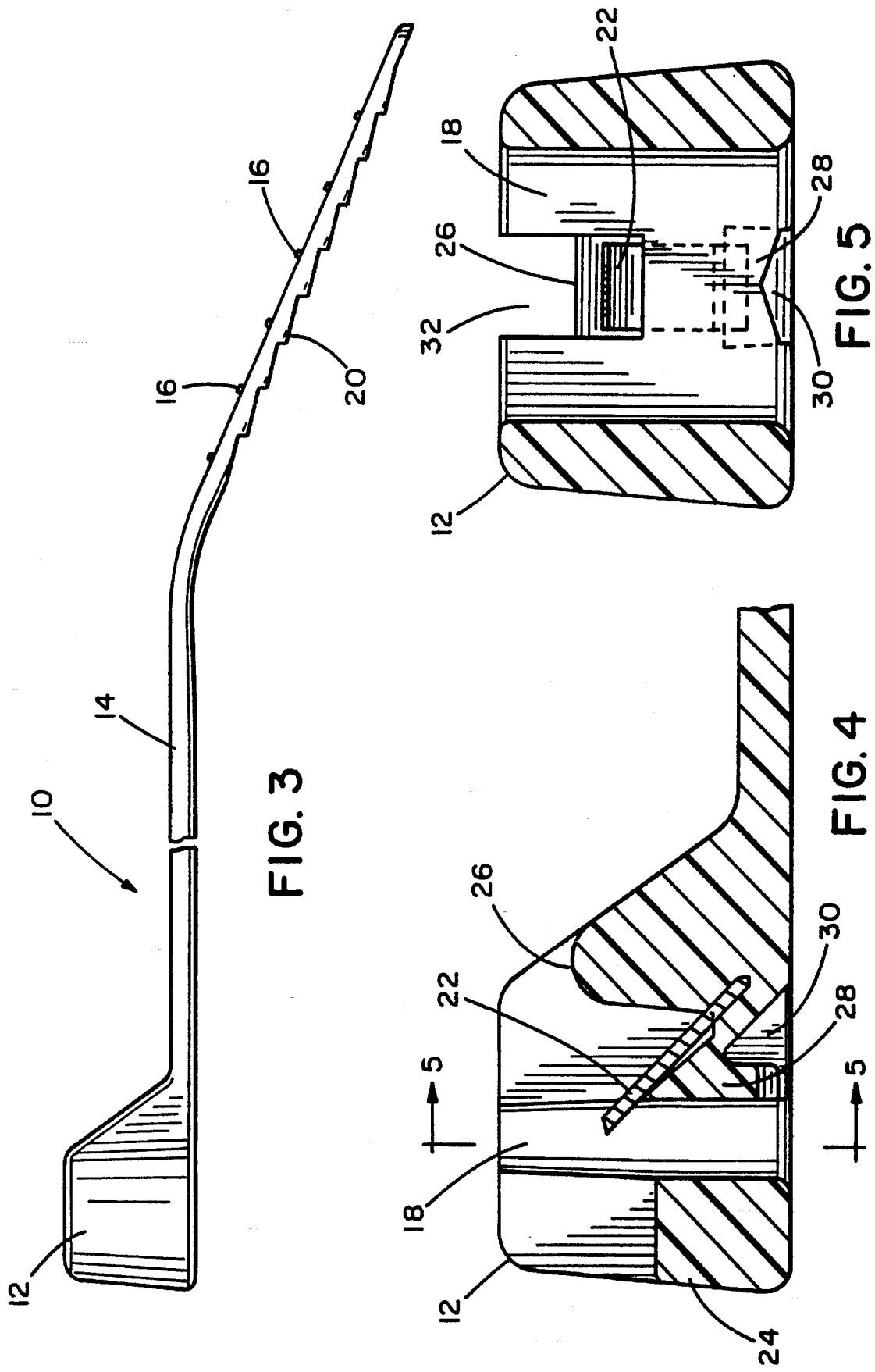

5,517,727

LOW THREAD FORCE CABLE TIE

This is a continuation in part of application Ser. No. 08/114,803, filed Aug. 31, 1993, abandoned.

TECHNICAL FIELD

The present invention relates generally to a low thread force cable tie, and more particularly to a cable tie of the type having a metal locking device inserted into a strap accepting channel formed through a strap locking head to act as a strap locking pawl.

BACKGROUND OF THE INVENTION

Plastic cable ties having a metal locking device inserted within a strap locking channel of the head of the cable tie are well known in the art. U.S. Pat. No. 3,186,047 to Schwester et al., U.S. Pat. No. 3,408,699 to Reynolds, U.S. Pat. No. 3,416,198 to Geisinger and U.S. Pat. No. 3,488,813 to Kohke are all examples of plastic cable ties having metal locking device disposed within a strap accepting channel of a cable tie head.

Cable ties of this type include a metal locking device partially embedded at an angle within the strap locking channel of the head of cable tie. The metal locking device member is situated at an angle so as to allow the strap to be inserted through the strap accepting channel but engaging the strap as it is pulled in a removing direction to prevent its removal. A solid support section, as part of the locking head, is generally provided below the embedded portion of the metal locking device. Thus as the strap end is inserted into the strap accepting channel, since the embedded part of the metal locking device is rigidly mounted, there is substantially no deformation of the support section part of the locking head and only the slight movement due to flexing of the free end of the metal locking device helps to ease the threading of the strap.

Having a cable tie that is easy to use while maintaining its strength is an important feature of cable ties of this type. It is therefore a significant advantage to have a metal locking device type cable tie in which it is easier to thread the strap while retaining the bundling strength of the tie.

In general, a low thread force two piece cable tie includes a cable tie comprising a strap having a first end and a free end, a locking head secured to the first end of the strap, a plurality of walls on the locking head forming a strap accepting channel, a metal locking device member having a free end and a mounted end positioned within the channel and mounted to the locking head, and pocket means formed on the locking head for allowing the mounted end of the metal locking device member to rotate slightly in a direction towards the strap accepting channel.

SUMMARY OF THE INVENTION

It is therefore an object of the present invention to provide a two piece metal locking device type cable tie that is easier to use.

It is a further object of the present invention to provide a two piece metal locking device type cable tie requiring a lower force to thread the free strap end.

BRIEF DESCRIPTION OF THE DRAWINGS

FIG. 1 is a perspective view of a cable tie of the present invention shown securing a bundle of wires;

FIG. 2 is a top view of the cable tie of FIG. 1;

FIG. 3 is a side view of the cable tie of FIG. 1;

FIG. 4 is a sectional view of the cable tie shown along lines 4—4 of FIG. 2;

FIG. 5 is a sectional view of the cable tie shown along lines 5—5 of FIG. 4;

DESCRIPTION OF THE PREFERRED EMBODIMENT

Figure 6:
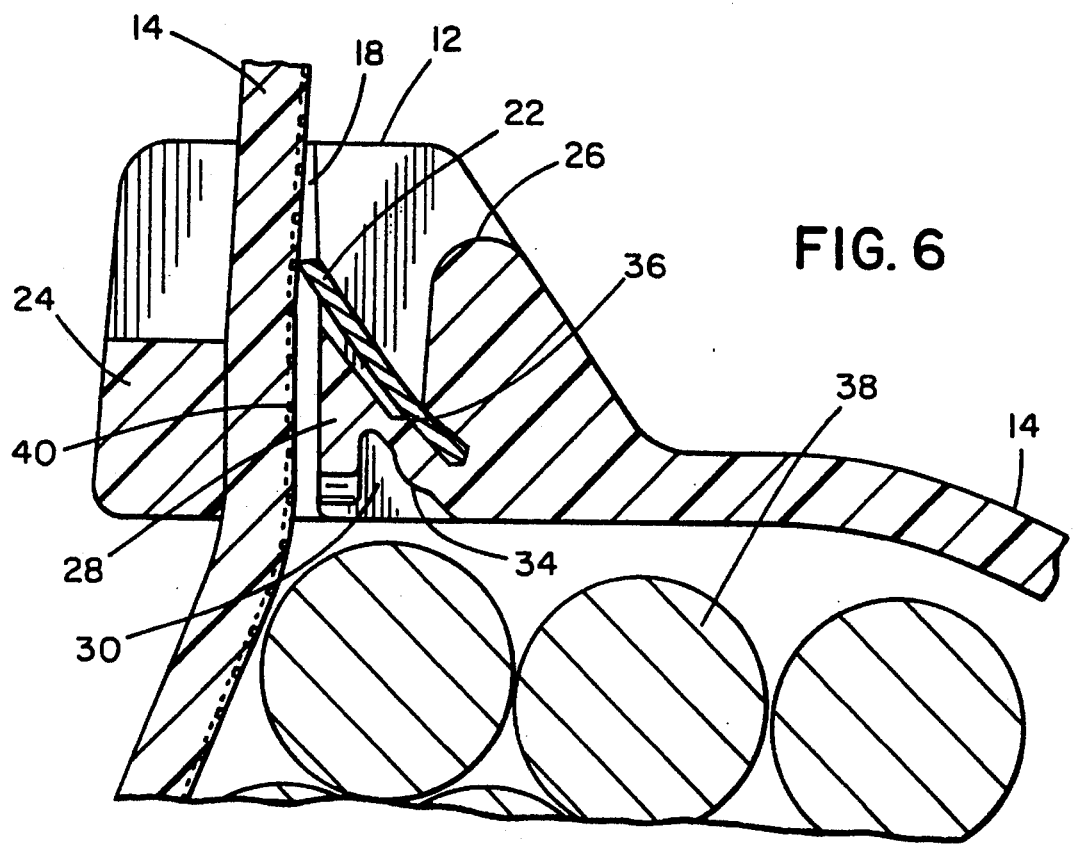
FIG. 6 is a sectional view of a strap being inserted through a locking head of the cable tie of FIG. 1.

A cable tie embodying the concept of the present invention is designated generally by the numeral 10 in the accompanying drawings. Cable tie 10 preferably is integrally molded of thermoplastic. As seen in FIG. 3, cable tie 10 includes a head 12 and a strap 14 as well as a number of other standard cable tie features. These standard features include gripping ridges 16 formed on the outside surface of the leading end of strap 14 and serrations 20 formed on the inside surface of the leading end of strap 14 as shown in FIG. 3. Strap 14, which has an angled and tapered leading end, is also provided with a pair of standard longitudinal ridges (not shown) and a series of dimples 40 which provide a metal locking device securing surface and a bundle gripping surface respectively. A strap accepting channel 18 is defined in head 12 by an end wall 24 and an inner wall 26 as well as a pair of side walls 42. A metal locking device 22 is partially embedded into inner wall 26 of strap accepting channel 18 at a preferred angle of 45 degrees to the axis of the strap, such that one end of metal locking device 22 is fixedly mounted within head 12 and the other free end acts as a strap restraining device as can be seen in FIG. 4. Inner wall 26 of locking head 12 also has a support portion 28 formed on its strap entry side.

Figure 7:
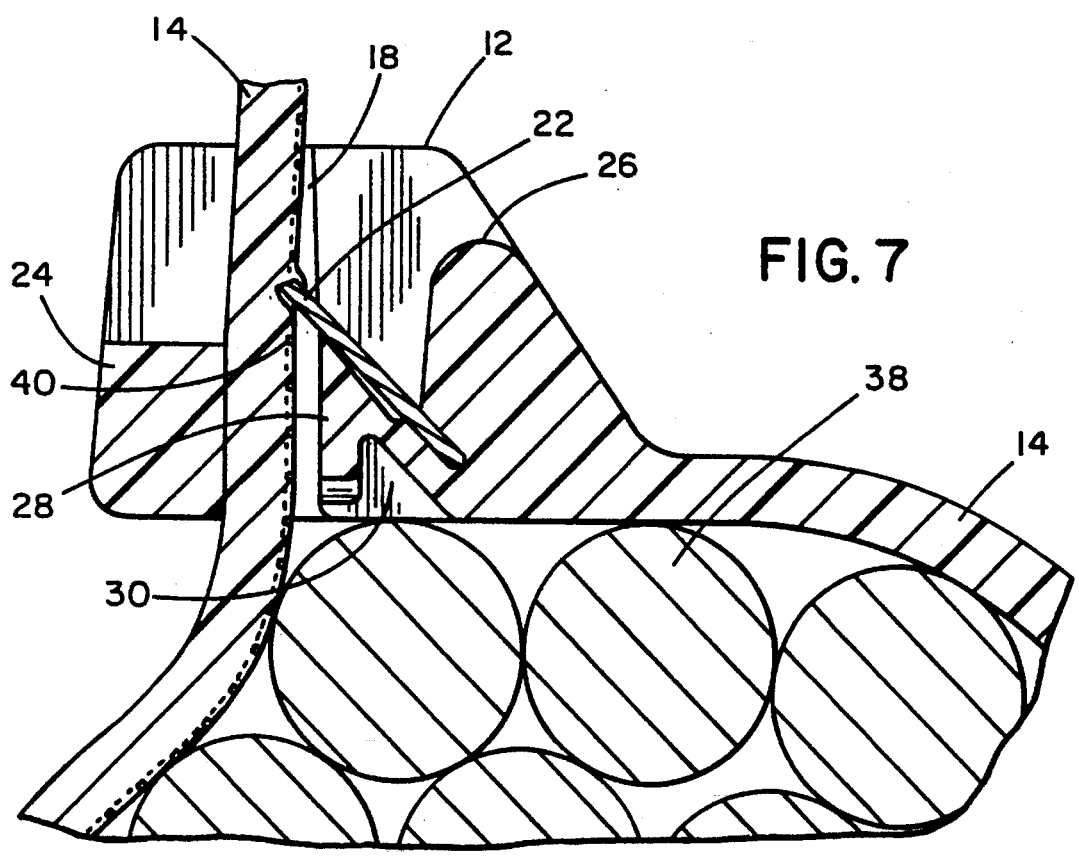
FIG. 7 is a sectional view of the strap secured in the locking head of the cable tie of FIG. 1.

As can be seen in FIG. 4, a cored out pocket 30 is formed adjacent metal locking device 22, within support portion 28 of inner wall 26, and adjacent the strap entrance side of strap accepting channel 18. Cored out pocket 30 leaves a thin plastic area beneath the embedded portion of metal locking device 22 rather than a thick, solid support section. Cored out pocket 30 is shaped substantially as a prism with one side paralleling the base of locking head 12, a second side paralleling the axis of strap accepting channel 18 and the third side paralleling the metal locking device 22. Cored out pocket 30 is formed having a depth such that part of support portion 28 that remains between metal locking device 22 and the third side of cored out pocket 30, is sufficiently thin to allow for the rotation of the embedded portion of locking device 22. As best seen in FIGS. 6 and 7, a strap tip inserted into the strap channel 18 exerts an upward force on the free end of metal locking device 22, and causes a slight rotation of metal barb 22 about its point of insertion 36 into the position shown in FIG. 6 resulting in a slight bulge 34 in the thin support layer beneath the mounted portion of barb 22. Bulge 34 is shown exaggerated for explanatory purposes in FIG. 6. The allowance of the rotation of the embedded portion of metal barb 22 against the thin support layer of cored out support portion 28 provides for easier threading of strap 14 while maintaining a secure application of cable tie 10 around wires 38 as shown in FIG. 6. Thus, cored out pocket 30 being disposed sufficiently close to the mounted end of metal barb member 22 for allowing increased rotation of the mounted end of metal barb member 22 towards cored out pocket 30 upon insertion of strap 14 through strap accepting channel 18 against the free end of metal barb member 22.

Locking head 12 is further provided with a channel 32 formed on a strap exiting side of strap channel 18 so as to be in a direction parallel to strap 14. Channel 32 merely provides for clearance for inserting metal barb 22.

Figure 8:
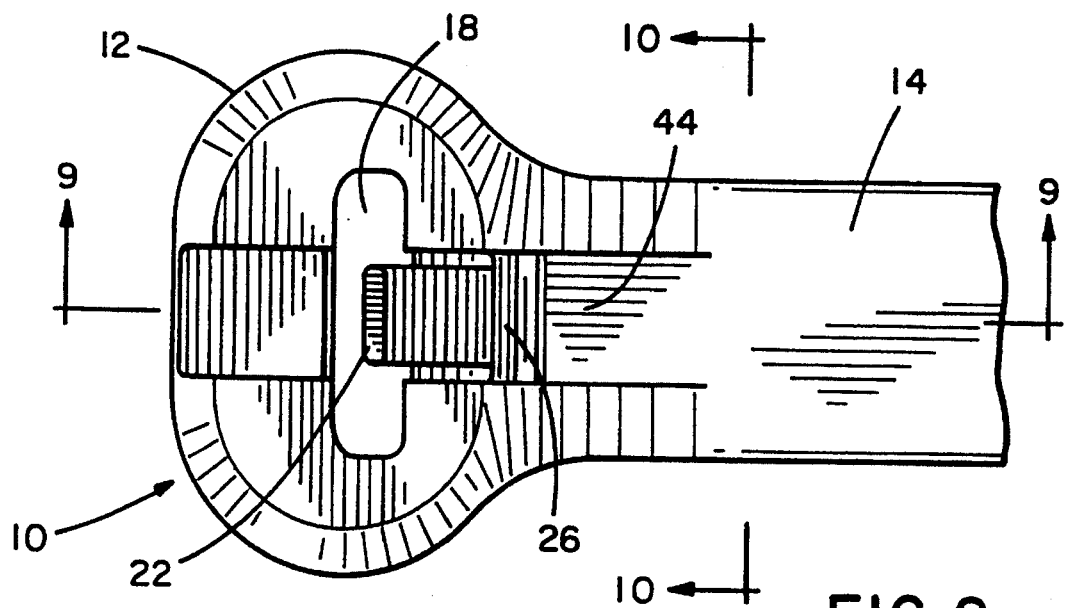
FIG. 8 is a top view of another embodiment of a cable tie of the present invention.
Figure 9:
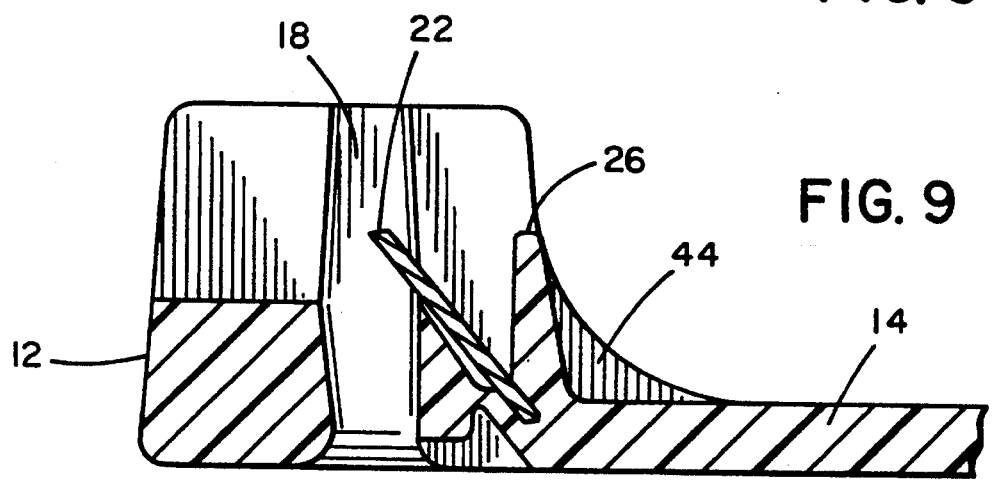
FIG. 9 is a sectional view of the cable tie of FIG. 8 shown along lines 9—9.
Figure 10:
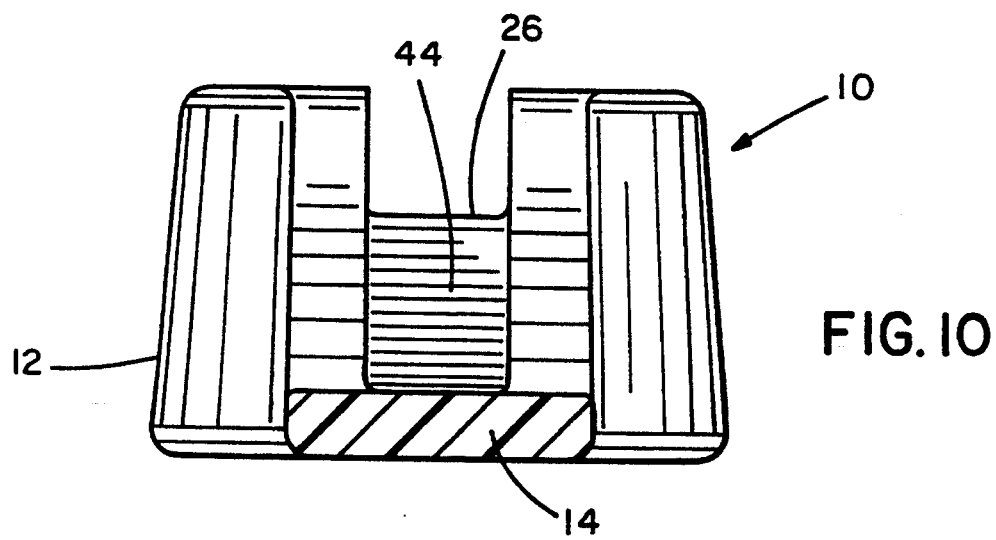
FIG. 10 is a sectional view of the cable tie shown along lines 10—10 of FIG. 8.

Another embodiment of cable tie 10 as shown in FIGS. 8–10 provides a cored out neck area 44 on the strap side of inner or rear wall 26 of locking head 12. The cored out neck area 44 is formed so as to have a depth such that the thickness of the neck region above the embedded portion of locking device 22 is substantially similar to that of the wall thickness below the embedded portion of locking device 22 created by cored out pocket 30. The cored out neck area 44 preferably has a width greater than metal locking device 22, but less than the cable tie strap 14. The cored out neck area 44 helps to reduce voids in the neck area during molding of cable tie 10 by eliminating the thick neck area of the tie. This elimination of voids allows for an easier and more precise insertion of metal locking device 22 into inner wall 26 from within the strap accepting channel 18. It has also been found that the metal locking device 22 might skew or turn at an angle during insertion. Insertion of metal locking device 22 is therefore made more precise due to the similar wall thicknesses above and below the embedded portion helping to reduce any skewing of the locking device 22.

Another embodiment of the present invention is to make a cable tie as shown in FIGS. 1–10, but including the utilization of a standard non-toothed stretch oriented cable tie strap as known in the industry. The standard stretch oriented strap is made so that when stretched in length, the molecules orient themselves and the tensile strength of the tie increases. It has been found that the decreased threading forces created by use of the cored out pocket allow for a better cable tie with a metal locking device using a stretch oriented strap.

While the particular preferred embodiment of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A cable tie, comprising:

a strap including a first end and a free end;

a locking head secured to the first end of the strap;

a plurality of walls on the locking head forming a strap accepting channel having a strap entry end and a strap exit end;

a metal locking device having a free end positioned within the strap accepting channel and a mounted end embedded through an inner wall surface into an inner wall of the locking head, wherein the inner wall includes an integrally formed support section generally disposed beneath the metal locking device on the strap entry end of the locking head; and pocket means formed on the support section directly underneath the mounted end of the metal locking device for allowing the mounted end of the metal locking device to rotate slightly in a direction towards the strap entry end of the strap accepting channel.

2. A cable tie as set forth in claim 1, wherein the pocket means has a sufficient depth so that a thin portion of the locking head remains below the mounted end of the metal locking device.

3. A cable tie as set forth in claim 2, wherein the pocket means is formed having substantially a prism shape.

4. A cable tie as set forth in claim 3, wherein the pocket means has a width greater than the width of the metal locking device.

5. A cable tie as set forth in claim 1, wherein the strap accepting channel extends transversely through the locking head.

6. A cable tie according to claim 1, wherein the strap is formed of a stretch oriented type material.

7. A cable tie according to claim 6, further including a cored out neck area formed on the rear wall of the locking head.

8. A cable tie according to claim 1, wherein the inner wall is adjacent to the first end of the strap.

9. A cable tie, comprising:

a strap including a first end and a free end;

a locking head secured to the first end of the strap;

a plurality of walls on the locking head forming a strap accepting channel having a strap entry end and a strap exit end;

a metal locking device having a free end and a mounted end positioned within the strap accepting channel and mounted through an inner wall surface to an inner wall of the locking head, wherein the inner wall includes an integrally formed support section generally disposed beneath the metal locking device on the strap entry end of the locking head; and a cored out pocket formed on the support section directly underneath the mounted end of the metal locking device.

10. A cable tie as set forth in claim 9, wherein the cored out pocket is disposed sufficiently close to the mounted end of the metal locking device for allowing increased rotation of the mounted end of the metal locking device towards the pocket means upon insertion of the strap through the strap accepting channel against the free end of the metal locking device.

11. A cable tie as set forth in claim 10, wherein the cored out pocket is formed having substantially a prism shape.

12. A cable tie as set forth in claim 11, wherein the cored out pocket has a width greater than the width of the metal locking device.

13. A cable tie as set forth in claim 12, wherein the strap accepting channel extends transversely through the locking head.

14. A cable tie according to claim 9, wherein the inner wall is adjacent to the first end of the strap.

15. A cable tie having a strap integral to a rear side of an inner wall of a locking head, wherein the locking head forms a strap accepting channel and contains a metal locking device partially embedded into the inner wall comprising:

a cored out neck area formed on the rear wall further including pocket means formed directly underneath a mounted end DE the metal locking device.

16. A cable tie according to claim 15, wherein the cored out neck area is formed to have a depth such that the wall thickness both above and below the embedded end of the metal locking device are substantially similar.

17. A cable tie according to claim 15, wherein the strap is formed of a stretch oriented type material.

* * * * *

UNITED STATES PATENT AND TRADEMARK OFFICE
CERTIFICATE OF CORRECTION

PATENT NO. : 5,517,727
DATED : May 21, 1996
INVENTOR(S) : Bernard et al.

It is certified that error appears in the above-identified patent and that said Letters Patent is hereby corrected as shown below:

Column 1, line 22, change "device" to --devices--.

Column 4, Claim 15, line 63, after "channel" insert --including a support section therein--.

Column 4, Claim 15, line 64, after "into" insert --said support section--.

Column 4, Claim 15, line 64, delete "the inner wall"

Column 4, Claim 15, line 67, change "DE" to --of--.

Column 4, Claim 15, line 67, after "device" insert --for allowing the mounted end of the metal locking device to rotate slightly in a direction towards a strap entry end of the strap accepting channel--.

Signed and Sealed this

Fourth Day of November, 1997

Attest:

BRUCE LEHMAN

*Attesting Officer*   *Commissioner of Patents and Trademarks*